US009058248B2

(12) United States Patent
Robinson et al.

(10) Patent No.: US 9,058,248 B2
(45) Date of Patent: *Jun. 16, 2015

(54) METHOD AND SYSTEM FOR SEARCHING FOR, AND MONITORING ASSESSMENT OF, ORIGINAL CONTENT CREATORS AND THE ORIGINAL CONTENT THEREOF

(71) Applicants: Leroy Robinson, Oak Bluffs, MA (US); Cynthia Myricks, Massillon, OH (US)

(72) Inventors: Leroy Robinson, Oak Bluffs, MA (US); Cynthia Myricks, Massillon, OH (US)

(73) Assignee: Leroy Robinson, Maplewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/832,807

(22) Filed: Mar. 15, 2013

(65) Prior Publication Data
US 2013/0204944 A1 Aug. 8, 2013

Related U.S. Application Data

(62) Division of application No. 13/015,031, filed on Jan. 27, 2011, now Pat. No. 8,510,154.

(51) Int. Cl.
G06F 11/00 (2006.01)
G06Q 30/02 (2012.01)
G06Q 50/00 (2012.01)
H04L 29/06 (2006.01)

(52) U.S. Cl.
CPC ............... *G06F 11/00* (2013.01); *G06Q 30/02* (2013.01); *G06Q 50/01* (2013.01); *H04L 65/403* (2013.01)

(58) Field of Classification Search
CPC ........................................................ G06F 11/00
USPC ............................................................ 705/12
See application file for complete search history.

(56) References Cited

U.S. PATENT DOCUMENTS

| 7,457,628 | B2 | 11/2008 | Blumberg et al. |
| 7,870,229 | B2 | 1/2011 | Spector |
| 2003/0061611 | A1 | 3/2003 | Pendakur |
| 2008/0168045 | A1 | 7/2008 | Suponau et al. |
| 2010/0019578 | A1 | 1/2010 | Schreiber |
| 2010/0205541 | A1* | 8/2010 | Rapaport et al. ............... 715/753 |
| 2011/0300916 | A1* | 12/2011 | Patchen ............................. 463/1 |

FOREIGN PATENT DOCUMENTS

| JP | 2006338100 A | 12/2006 |
| KR | 20010044118 A | 6/2001 |
| KR | 20030000185 A | 1/2003 |

OTHER PUBLICATIONS

Fitzgerald, Michael. How Warner Music and Its Musicians Are Combating Declining Album Sales Jul. 1, 2010 (http://www.fastcomp~y.comlmagazine/1471take-us-to-the-river.html). retrieved from IDS.*

(Continued)

*Primary Examiner* — James A Reagan
(74) *Attorney, Agent, or Firm* — Lerner, David, Littenberg, Krumholz & Mentlik, LLP

(57) ABSTRACT

System and method may use assessment information obtained by assessing original content items or creators of the original content items in accordance with a hierarchical talent assessment process, to return search results responsive to a search for talented original content creators. The assessments of the creators and the content items by talent assessors may be monitored to increase the objectivity of the search results returned responsive to a search for talented original content creators.

7 Claims, 8 Drawing Sheets

(56) References Cited

OTHER PUBLICATIONS

Holland, "Go Virtual With Your Work Force", http://www.entrepreneur.com/article/201180 </article/201180> (2009).
Fitzgerald, FastCompany.com, http://www.fastcompany.com/magazine/147/take-us-to-the-river.html?page=0%2C4 (2010).

The Los Angeles Recording School, Turn Your Passion for Music Into Your Career (2008).

International Search Report and Written Opinion for Application No. PCT/US2011/065805 dated Aug. 17, 2012.

* cited by examiner

| 52 Week Score Range | | | Historical Source Data | | YTD% Change 0.1% | |
|---|---|---|---|---|---|---|
| Low | Current (•) | High | Current | 1 Day Change | 1Yr. Change | YTD Change |
| 3,926 | -----•--- | 7,697 | 6,780.51△ | +23.91 | +18.97 | +7.97 |
| Vote Volume | Today | Week | Past Month | Past Year | Aggregate Total |
|---|---|---|---|---|---|
| | 300 | 2,015 | 6,975 | 13,112 | 18,275 |
FIG. 6
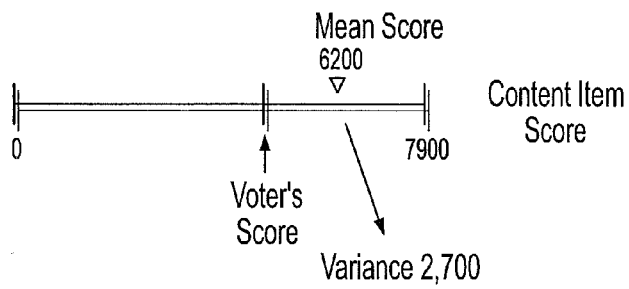
FIG. 7A
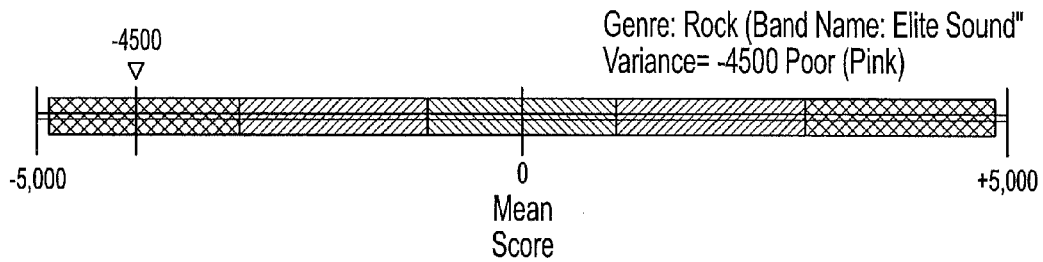
FIG. 7B
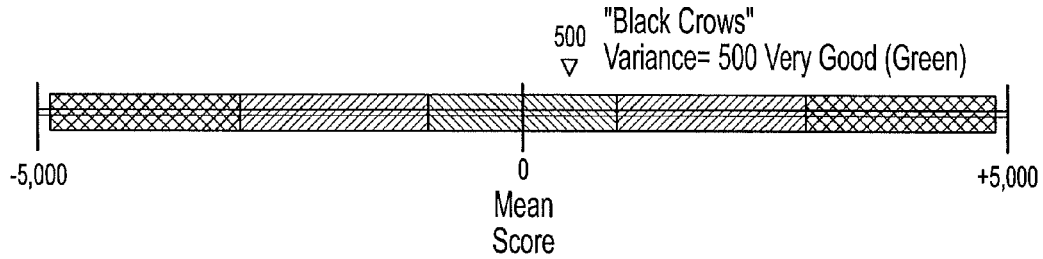
FIG. 7C

METHOD AND SYSTEM FOR SEARCHING FOR, AND MONITORING ASSESSMENT OF, ORIGINAL CONTENT CREATORS AND THE ORIGINAL CONTENT THEREOF

CROSS-REFERENCE TO RELATED APPLICATIONS

The present application is a divisional of U.S. application Ser. No. 13/015,031, filed on Jan. 27, 2011, the disclosure of which is incorporated herein by reference.

BACKGROUND OF THE INVENTION

The advent of communication networks, and in particular the Internet, has caused marketing, distribution and production of original, creative or artistic content, such as music, video, books, etc. ("original content"), to become decentralized, and also has resulted in a literal tidal wave of original content becoming available to a very large number of people. Moreover, the availability of original content on the Internet is expected to grow exponentially in the years to come.

Currently, it is difficult to identify, based on a search of the Internet, a creator of original content who is objectively deemed to be talented, for example, a musical artist who is deemed to be talented in a particular genre, in relation to the various creators of original content in the same genre that make their original content available on the Internet. The original content on the Internet typically generally is not organized in a manner in which the creators of the original content, or their original content, can be differentiated in terms of objective talent ratings, such that the original content and/or the original content creators, together with talent ratings of the creators and/or their original content, can be readily searched and accessed. Such talent rating information is desired, for example, by fans, industry talent scouts and professionals on the fringes of the entertainment industries, who desired to find original content creators having talent.

Although original content creators today may have their original content accessible to virtually the entire world by posting the original content on the Internet, because the amount of original content on the Internet is so large, the original content creators that indeed are objectively worthy of talent recognition may never become recognized.

Current search engines may return results of a "most popular" original content item, which may, for example, be based on the number of webpage hits, views or downloads of the original content item. The results retrieved, however, may only represent popularity of a creator or original content item, and do not necessarily indicate or provide any information as to an objective assessment of the level of talent of the original content creator. In addition, individuals that participate in current original content assessments, for example, a "like it" button function on the FACEBOOK website or a contest in which individuals may vote for a favorite artist such as in the popular television program AMERICAN IDOL, oftentimes rush to vote for an original content item or creator, and may not vote with diligence because, for example, they may only be trying to qualify for a prize or a promotion.

Therefore, there exists a need for method and system for organizing original content item and original content creator information to provide that whether original content creators have talent may be determined with objectivity based on assessments of their original content items, and that information related to the talent assessments may be readily retrieved from a search performed concerning the original content items and the creators.

SUMMARY OF THE INVENTION

In accordance with an aspect of the invention, a method of providing assessment information may include receiving, over a communication network at a server, assessment information on a plurality of assessable elements based on assessment of the assessable elements by a plurality of assessors, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor. The method may further include searching, by a processor, using received assessment information, to generate a search result responsive to a request to search for an assessable element having a higher average voting score than other of the assessable elements, wherein the request includes as a search condition at least one of (i) a characteristic of an assessable element, (ii) a category of the assessor for which the assessment information indicates voting for an assessable element among the assessable elements to which the request to search is directed, and (iii) voting score status. The method also may include providing the search result indicating, for an assessable element returned as the search result, (i) a voting score status, the voting score status being based on voting by the assessors in at least one predetermined category of the plurality of categories, and (ii) at least one characteristic of the assessable element identified from the search.

In accordance with another aspect of the invention, a system for providing assessment information may include a controller including a processor and a memory. The processor may be operable to: receive assessment information on a plurality of assessable elements, provided over a communication network to the controller and which is based on assessment of the assessable elements by a plurality of assessors, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor; search, using the received assessment information, responsive to a request to search for an assessable element having a higher average voting score than other of the assessable elements, to obtain a search result, wherein the request includes as a search condition at least one of (i) a characteristic of an assessable element, (ii) a category of the assessor for which the assessment information indicates voting for an assessable element among the assessable elements to which the request to search is directed, and (iii) voting score status; and provide the search result indicating, for an assessable element returned as the search result, (i) a voting score status, the voting score status being based on voting by the assessors in at least one predetermined category of the plurality of categories, and (ii) at least one characteristic of the assessable element identified from the search.

In accordance with another aspect of the invention, a method of monitoring assessment information may include registering, with a server, (i) a plurality of assessable elements to be eligible for voting thereon by a plurality of assessors and (ii) the plurality of the assessors to be eligible to vote on the assessable elements, wherein registering of the assessable elements includes a subscription fee payment and registering of the assessors includes a minimum requirement for purchasing from the server over a predetermined period so as to be eligible to receive an award. The method may further include monitoring, in substantially real time, assessment by the assessors for the assessable elements based on assessment information received over a communication network, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor. In addition, the method may include generating, in substantially real time, display data to control display on a screen display of voting score results of the first assessor relative to at least one other of the assessors that voted on a same assessable element for which the first assessor voted.

In accordance with another aspect of the invention, a system for monitoring assessment information may include a controller including a processor and a memory. The processor is operable to: register with the system (i) a plurality of assessable elements to be eligible for voting thereon by a plurality of assessors and (ii) the plurality of the assessors to be eligible to vote on the assessable elements, wherein registering of the assessable elements includes a subscription fee payment and registering of the assessors includes a minimum requirement for purchasing from the server over a predetermined period so as to be eligible to receive an award; monitor, in substantially real time, assessment by the assessors for the assessable elements based on assessment information received over a communication network, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor; and generate, in substantially real time, display data to control display on a screen display of voting score results of the first assessor relative to at least one other of the assessors that voted on a same assessable element for which the first assessor voted.

In accordance with another aspect of the invention, a method of providing assessment information may include receiving, over a communication network at a server, assessment information on a plurality of assessable elements based on assessments on the assessable elements by a plurality of assessors, wherein the assessment information for the assessable elements indicates a voting preference among a plurality of predetermined voting preferences submitted by the assessor. The method may further include generating, by a processor, for a first assessable element assessed by a first assessor, display data to display on a first screen display selectable indicia indicating the voting preference of the first assessor arranged in one of a plurality of predetermined displays areas corresponding to the respective voting preferences. In addition, when the indicia is selected, a second screen display may be generated including a comment submitted by the first assessor with the voting preference.

In accordance with another aspect of the invention, a system for monitoring assessment information may include a controller including a processor and a memory. The processor may be operable to: receive assessment information on a plurality of assessable elements, which is provided over a communication information and based on assessments on the assessable elements by a plurality of assessors, wherein the assessment information for the assessable elements indicates a voting preference among a plurality of predetermined voting preferences submitted by the assessor; and generate for a first assessable element assessed by a first assessor, display data to display on a first screen display selectable indicia indicating the voting preference of the first assessor arranged in one of a plurality of predetermined displays areas corresponding to the respective voting preferences. In addition, when the indicia is selected, a second screen display may be generated including a comment submitted by the first assessor with the voting preference.

In accordance with another aspect of the invention, a method of providing assessment information may include receiving, over a communication network at a server, assessment information on a plurality of assessable elements based on assessment of the assessable elements by a plurality of assessors, wherein the assessment information indicates a voting score among a plurality of voting scores, and wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor. In addition, the method may include, responsive to a request to search having voting score result status as a search condition and using the assessment information, controlling display, in substantially real time, on a display screen of a voting score result for at least one of the assessable elements with at least one of (i) an indication of a characteristic of the one assessable element; (ii) a selectable item to enable rendering or acquisition of the one assessable element; and (iii) a selectable item to enable voting with a voting score for the one assessable element.

In accordance with another aspect of the invention, a system for providing assessment information may include a controller including a processor and a memory. The processor may be operable to receive assessment information on a plurality of assessable elements, which is provided over a communication network and based on assessment of the assessable elements by a plurality of assessors, wherein the assessment information indicates a voting score among a plurality of voting scores, and wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor. In addition, the processor may be operable, responsive to a request to search having voting score result status as a search condition and using the assessment information, to control display, in substantially real time, on a display screen of a voting score result for at least one of the assessable elements with at least one of (i) an indication of a characteristic of the one assessable element; (ii) a selectable item to enable rendering or acquisition of the one assessable element; and (iii) a selectable item to enable voting with a voting score for the one assessable element.

In an embodiment of the above aspects, the assessable element may be at least one of an original content item and an original content creator.

In accordance with another aspect of the invention, a method of providing content assessment information may include receiving, at a server, an assessable content item and associated content item characteristic information from a content contributor. In addition, the method may include providing the assessable content item with the associated information for access by a plurality of evaluators when the content contributor is registered with the server, wherein the evaluators are registered with the server and can access the content item according to a characteristic of content items and a category of the evaluator within an hierarchy to assess the content item according to predetermined rating criteria categories, wherein the rating criteria categories have different weightings and a score within a predetermined range can be assigned to the rating categories; and providing access to voting result information for the content item to at least one of the content contributor and the evaluators, wherein the voting result information includes feedback information from the evaluators and a cumulative voting score for the content item.

In accordance with another aspect of the invention, a system for providing content assessment information may include a controller including a processor and a memory. The processor may be operable to receive an assessable content item and associated content item characteristic information from a content contributor, provided over a communication network. In addition, the processor may be operable to provide for access to the assessable content item with the associated information by a plurality of evaluators when the content contributor is registered with the server, wherein the evaluators are registered with the server and can access the content item according to a characteristic of content items and a category of the evaluator within an hierarchy to assess the content item according to predetermined rating criteria categories, wherein the rating criteria categories have different weightings and a score within a predetermined range can be assigned to the rating categories. Further, the processor may be operable to provide for access to voting result information for the content item to at least one of the content contributor and the evaluators, wherein the voting result information includes feedback information from the evaluators and a cumulative voting score for the content item.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which:

FIG. 6 is an exemplary screen display of talent assessment results, in accordance with an aspect of the present invention.

FIGS. 7A, 7B and 7C are an exemplary screen displays of talent assessment results, in accordance with an aspect of the present invention

DETAILED DESCRIPTION

In accordance with aspects of the present invention, a search may be conducted on a communication network site, such as an Internet website, to retrieve as a search result an original content creator determined, with objectivity, to have talent, based on assessment of original content of the original content creator in accordance with a hierarchical talent assessment process associated with the website. The search may also return descriptive and other information related to the original content creator, including information relating to talent assessment of the original content creator and original content items of the creator by individuals registered with the website to participate in a talent assessment process. Further, the talent assessments by the registered individuals may be monitored with respect to quantity, accuracy and consistency, to provide for retrieval of assessment information in a search, and to award the individuals providing the assessments based on a combination of their participation in the talent assessment process and their ability to recognize an original content creator deemed to be talented based on assessment results obtained from a talent assessment process managed by the website.

Figure 1:
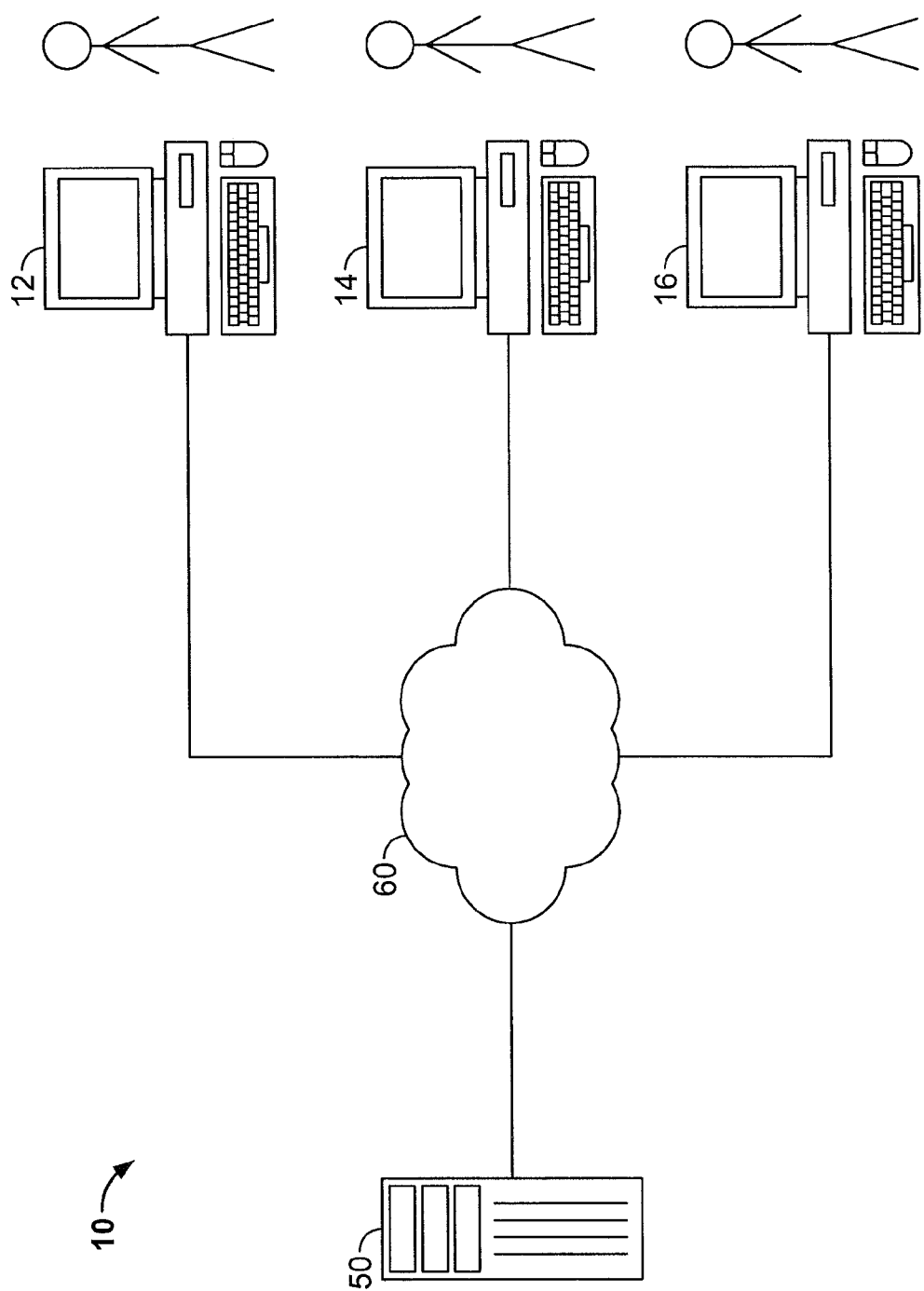
FIG. 1 is a block diagram of a system, in accordance with an aspect of the present invention.
Figure 2:
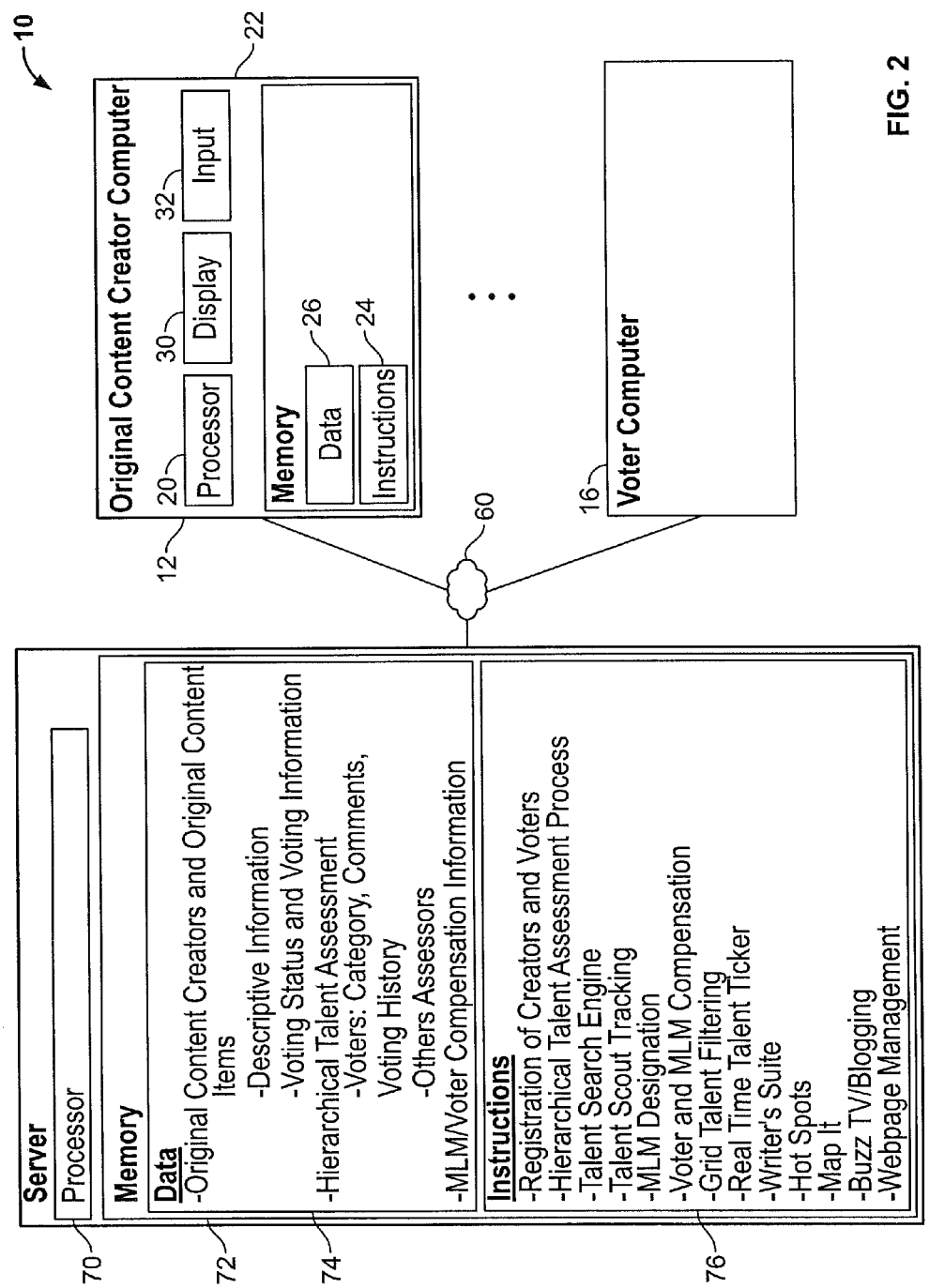
FIG. 2 is a block diagram of an exemplary embodiment of the system of FIG. 1.

Referring to FIGS. 1 and 2, a system 10 for organizing original content information concerning original content creators and their original content items, and providing that a search may be conducted of the original content information to identify a particular original content creator determined to have talent with objectivity based on a hierarchical talent assessment process (HTAP), in accordance with aspects of the invention, may include client computers 12, 14, 16, which are used to communicate with a server 50 over a communication network 60.

Each of the computers 12, 14, 16 may contain a processor 20, memory 22 and other components typically present in general purpose computers. In addition, the server 50 may contain a processor 70 and a memory 72.

The memory 22 stores information accessible by the processor 20, including instructions 24 that may be executed by the processor 20 and data 26 that may be retrieved, manipulated or stored by the processor 20. Similarly, the memory 72 stores information accessible by the processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable, read-only memories.

The processors 20, 70 may comprise any number of well known processors, such as processors from Intel Corporation. Alternatively, the processors may be a dedicated controller such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 26, 74 may be retrieved, stored or modified by the processors 20, 70 in accordance with the instructions 24, 76, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 2 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, each client computer may be a general purpose computer, intended for use by a person, having all the internal components normally found in a personal computer such as a central processing unit (CPU), a display 30, an input 32 such as a CD-ROM drive, mouse, keyboard or microphone, and a hard-drive, speakers, modem and/or router (telephone, cable or otherwise) and all of the components used for connecting these elements to one another. Moreover, computers in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 1 are the mouse and keyboard, other means for inputting information from a human into a computer are also acceptable such as a microphone, touch-sensitive screen, voice recognition, etc.

The server 50 and the client computers 12, 14, 16 are capable of direct and indirect communication, such as over the network 60. Although only a few client computers and a single server are depicted in FIGS. 1 and 2, it should be appreciated that a typical system can include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. In one embodiment, the server 50 may be a web server, and the client computers include browsers for facilitating communications with the server 50. Although certain advantages are obtained when information is transmitted or received as noted above, other aspects of the invention are not limited to any particular manner of transmission of information. For example, in some aspects, the information may be sent via a medium such as a disk, tape, CD-ROM.

The information may also be transmitted over a global or private network, or directly between two computer systems, such as via a dial-up modem. In other aspects, the information may be transmitted in a non-electronic format and manually entered into the system.

Referring to FIG. 1, the computer 12 may be operated by an original content creator, such as a musician, to provide original content items, such as a song or video clip including the song, as a digital file to the server 50, along with descriptive information about the original content creator and his original content items. The original content creator may be required to register with the server 50, in order to submit original content items, so that the original contents items and information concerning the original content items as well as the original content creator, are available for access by others and retrieval as a search result from a search, and also to provide that the original content items may be assessed as part of a HTAP and that results of a HTAP may be retrieved from a search, as discussed in detail below.

The computers 14, 16 may be used by individuals to register with the server so that they can access original content information and related information on the server, and also become voters who assess original content items and/or creators according to a HTAP managed by the server 50. As discussed below, the voters may provide comments on original content creators and their original content items that may be retrieved from the server 50.

It is to be understood that the system 10 may include a plurality of computers 12, 14 and 16 that individuals may use to submit to the server 50 original content items to be made available for download and playback, and to provide talent assessment information as part of a HTAP managed by the server. In addition, the server 50 may be accessed from the computers 12, 14, 16 to conduct a search for original content items and original content creators according to entered search criteria, which desirably may include status of talent assessment results, such as voting results, of a HTAP concerning particular original content items and/or creators.

Referring to FIG. 2, the data 74 in the server 50 may include information relating to or including: original content creators who submit original content items to the server to be assessed under a HTAP; the original content items submitted; assessment results from or relating to a HTAP; and individuals registered with the server 50, such as individuals registered as voters, to participate in a HTAP. The original content creators may include, for example, musicians, dancers, entertainment production directors, fashion designers, models, actors, comedians, artists, amateur or professional athletes, writers and the like. The original content creators may supply, in electronic files, original content items, such as or in the form of songs, videos and documents including books, articles, scripts, compositions and the like. The information concerning or relating to the original content creator or the original content items of the creator may include (i) information submitted by the creator, such as geographic location, industry of interest, genre(s) and/or subgenre(s) of interest in an indicated industry, age, sex, income and like descriptive information; and (ii) information obtained based on a talent assessment in accordance with a HTAP, such as voting status of the original content creator and of original content items submitted by the creator and feedback and comments by voters who voted for the creator or the creator's content items as part of a HTAP. For example, the descriptive information for an original content creator who is a musician may be as follows: music industry; a genre selected from, for example, Latino, country, rock, pop, rap, R&B, reggae, techno and gospel; a subgenre of the genre, such as a subgenre of the Latino genre selected from Mexican, Pop, Meringue, Salsa, etc.; a type of instrument played by the musician, such as keyboard; subtype of instrument, such as an electric keyboard or piano; geographic location; and time and geographic location of a scheduled performance.

The information for a HTAP may include a relevant industry, genre and subgenre in the industry, and voting result information for original content creators and original content items included in a voting cycle conducted in accordance with a HTAP, as described in further detail below.

The descriptive information for a voter may include demographic data, such as age range, industry of interest, genre of interest within industry of interest, geographic location of home or office, educational level, race, income range, marital status, current employment or student status, employment experience and employment history. In addition, the information associated with a voter may include feedback and comments the voter provides on original content items or creators as part of a HTAP.

In addition, the information for a voter may include a voting category within a hierarchy associated with a HTAP that may be performed for a particular industry that is of interest to the voter. The voting category may be assigned to the voter by the server 50 based on the descriptive information provided by the voter during registration with the server, as described below. For example, referring to FIG. 4, voting categories for a HTAP conducted for the musical industry may be in a hierarchy, from a lowest level to a highest level, as follows: members of the general public (fans) (Category 1); peer evaluators, such as other musicians in the same or related genre (Category 2); educators (Category 3); music media reporters and bloggers (Category 4); DJ's and radio program directors (Category 5); executives and music producers in the musical industry responsible for identifying new musicians who are talented (Category 6). The voting category of a voter determines when the voter may vote in a voting cycle conducted in accordance with a HTAP.

Further, the data 74 in the server 50 may include information relating to individuals designated as multi-level marketers (MLMs), and information for determining compensation of MLMs by the server 50. A MLM is an individual, optionally a voter, who has been designated by the server 50 to be eligible to receive an award or compensation, based on the success of an original content creator the MLM selects to represent. The MLM is associated with other voters registered with the server. Depending on the success of the creator represented by the MLM, which may be determined using voting results from a HTAP, sales or licenses of original content items of the creator and the quantity and accuracy of voting by the voters associated with the MLM, the MLM may obtain awards, including financial compensation, from the server, as discussed in detail below.

In addition, the data 74 may include information for providing an award, such as financial compensation, to voters based on quantity of votes cast, and also accuracy and consistency of voting for creators deemed to have talent based on voting by other voters, as described in further detail below.

The instructions 76 may contain instructions that the processor 70 can execute to register individuals as original content creators and voters with the server, or with a talent search website operated and/or affiliated with the server; to facilitate and manage an assessment, with objectivity, of talent of original content creators and/or their content items in accordance with a HTAP; to facilitate searching of a database of information relating to original content creators and their original content and to voters and their participation in a HTAP, where the searching may be performed by descriptive information of the creators and original content items and desirably using voting result information to return search results indicating creators deemed to have talent based on assessments result from a HTAP; and to monitor talent assessments, such as voting by voters, of original content creators and/or their original content items according to a HTAP and to determine awards for voters based on such factors as quantity, accuracy and consistency of voting.

In addition, the instructions 76 may provide for designation of individuals as MLMs. In addition, the instructions 76 may provide for an award to MLMs, based on success of original content creators selected by the MLMs, as determined by the server 50, and actions of the voters associated with the MLMs. In one embodiment, the success of the creator may be determined as a function of the number of votes received by the creator, or a number of downloads or purchases of original content items of the creator.

Further, the instructions 76 may provide for determining an award for a voter based on voting in accordance with a HTAP. The award may be a function of the quantity of votes cast by the voter during a voting cycle(s), the accuracy of the voting for creators, and their content, who are deemed to be talented based on voting by other voters, and the consistency with which the voter votes for creators who are deemed to be talented based on voting by other voters.

In addition, the instructions may provide for control of display on a screen display of: search results obtained; real time assessment information for original content creators and their content items arranged based on voting preferences of talent assessors and commentary and feedback information supplied by the talent assessors; different types of original content items within a genre or sub-genre, differentiated from one another, such as by color, with or linked to voter hierarchy category information and information indicating progression of voting for the original content creator and/or the creator's content during the course of a voting cycle; and selectable icons which, upon selection, may provide real time geographic location information concerning talent assessors, such as voters, and original content creators determined to have a predetermined level of talent based on talent assessment results obtained in accordance with a HTAP.

In addition, the instructions 76 may provide for generating webpages on a website which provide for registration and searching by individuals, and which include information specific to a registered creator or voter, assessment results, such as voting results for a voting cycle in a particular industry or genre of an industry, and any other information collected or managed by the server 50.

The instructions 24 of the computer 12 may contain instructions that the processor 20 can execute to access the website hosted by the server 50 so as to supply information, request searches to be performed, provide assessment information, such as obtained from voting by voters, as part of a HTAP and perform other operations associated with the website.

In addition to the operations illustrated in FIGS. 1-2, operations in accordance with a variety of aspects of the inventive method will now be described. It should be understood that the following operations do not have to be performed in the precise order described below. Rather, various steps can be handled in reverse order or simultaneously.

Figure 3:
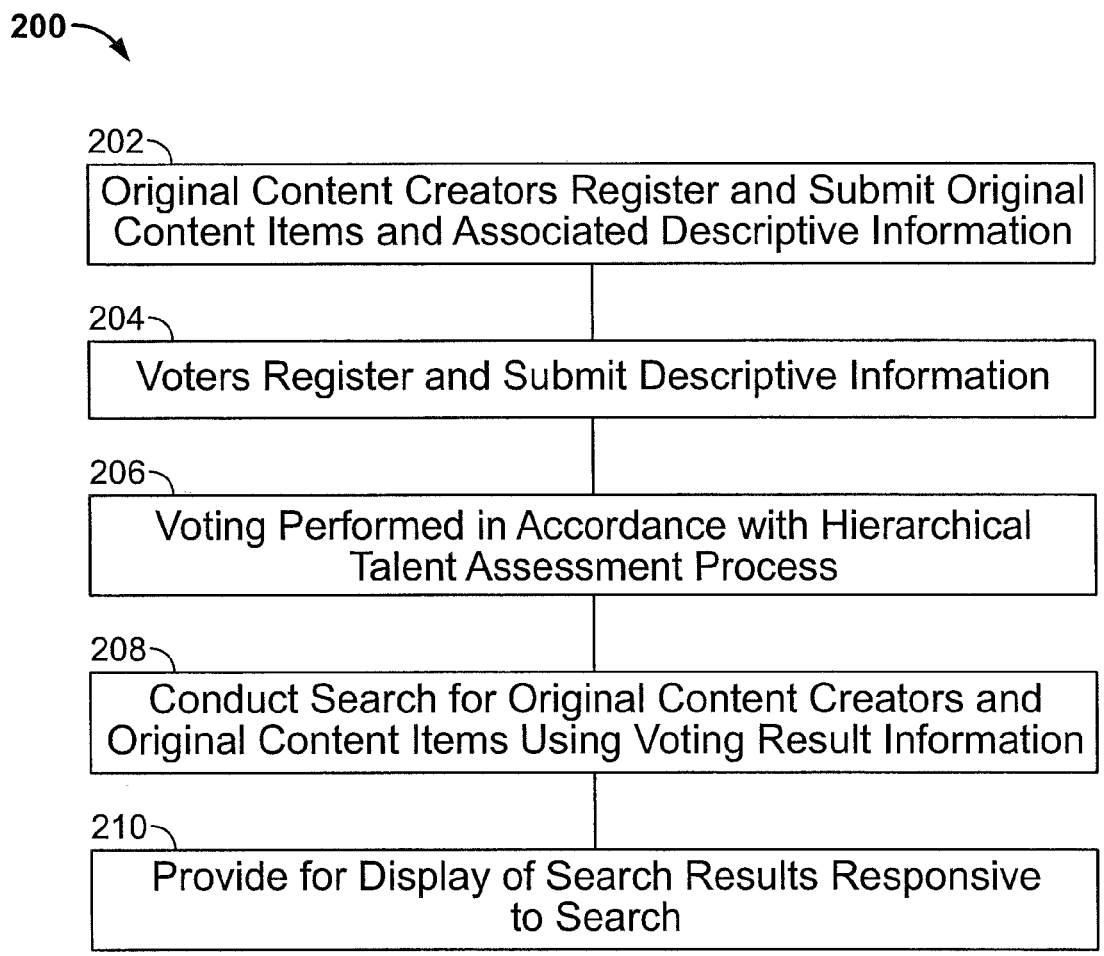
FIG. 3 is a flow diagram of a process for searching using talent assessment information, in accordance with an aspect of the present invention.

FIG. 3 illustrates an exemplary method 200 to provide that a search may be performed at a website accessed over a communication network, to retrieve search results concerning original content creators of interest who have been deemed, with objectivity, to have talent, based on assessments of the creators and their original content items obtained from a HTAP performed, in accordance with aspects of the present invention. For purposes of highlighting features of the present invention, the method 200 is described in connection with operations performed by components of the system 10 of FIGS. 1 and 2, and exemplary screen displays of a talent assessment website associated with the server 50 of the system 10, as shown in FIGS. 5-10. It is to be understood that reference herein to operations or processing performed by the server 50 or a website managed or associated with the server 50 may be performed by the processor 70 based on instructions 76 and using the data 74 and other data, as set forth below.

Referring to FIG. 3, in block 202, an original content creator may use the computer 12 to register with the server 50 on a registration webpage of a talent assessment website associated with the server 50. During registration, the creator may supply descriptive information, such as age, industry and genre of interest, and the like. Once registered with the website, the creator may submit original content items, such as electronic files in MPEG or other suitable formats, and descriptive information related to the content items. For purposes of illustration of the method 200, the original content creators may be musicians who submit their original musical songs for talent assessment in accordance with a HTAP managed by the website associated with the sever 50, and to provide that the musical songs, and other information concerning the songs and the musicians, including talent assessment information, such as voting results, from a HTAP managed by the talent website, may be accessed in searching performed on the talent website of the server 50.

It is be understood that the original content creators and their original content items may be from any field or industry in which the talent of the creator can be assessed, such as dance, music, literature, acting, sports, etc. The descriptive information submitted by a musician, for example, may include type of industry, e.g., music, genre such as rock and roll, instrument such as piano, geographic location, such as New York, contact information, biographical information, etc. The creator may continuously update the descriptive information on the server 50, as needed. The information, including content items, provided by the creators is stored as the data 74 in the memory 72.

In one embodiment, the registration of the content item or the creator may require payment of a subscription fee.

In block 204, an individual who desires to participate in a HTAP managed by the talent website may register as a voter with the talent website using the computer 16. In one embodiment, individuals who register as voters are the only persons that can vote for an original content item during a voting cycle of a HTAP managed by the server 50. An individual may register to become a voter without registering to become an original content creator. In addition, an original content creator may register to become a voter, or the website automatically may register the creator as a voter.

When a voter is registered, a password is assigned to the voter. The password is used to associate descriptive information of the voter, such as name, age, education level, industry of interest, etc., submitted by the voter during registration or afterwards, with the voter, and to allow monitoring of assessments, such as voting, and comments submitted by the voter, in connection with a HTAP. In addition, the server 50 may assign a voting hierarchy category to the voter, based on the information provided by the voter concerning an industry of interest, genre of interest, and experience or employment position in the industry of interest.

For ease of reference, when reference is made below to the server 50 or the talent website receiving, transmitting and processing data in connection with a voter or creator, the voter or the creator is assumed to be registered with the server 50 or the talent website as a voter or creator, unless otherwise stated.

Figure 4:
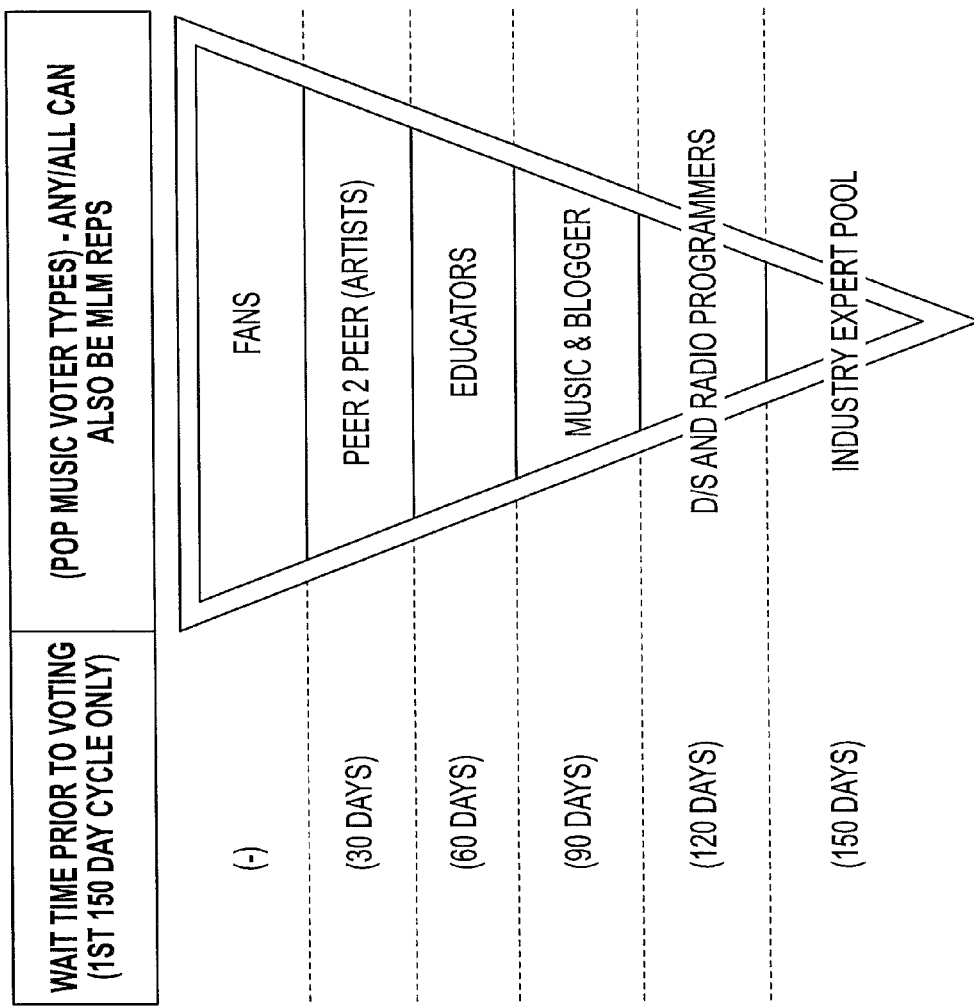
FIG. 4 illustrates an exemplary a hierarchical talent assessment process, in accordance with an aspect of the present invention.

Referring to FIG. 4, a voter interested in the musical industry may be assigned a category in a hierarchy which, from lowest to highest, includes fans (Category 1), peers (Category 2), educators (Category 3), bloggers (Category 4), DJs and radio programs (Category 5), and industry experts such as producers and directors (Category 6). The descriptive information concerning the voter, and also voting result information specific to the voter, which may include number of votes cast, content items and/or creators voted for and comments and feedback provided regarding content items and/or creators, is stored as the data 74 in the memory 72.

Referring again to FIG. 3, in block 206, the server 50 may initiate a voting cycle which is part of a HTAP, in accordance with an aspect of the invention, for an original content creator, after submission of one or more original content items by the creator. The voting cycle, as shown in FIG. 4, may be for a time period, such as 180 days. It is assumed that, in operation of the talent website, each of thousands of original content creators may submit at least one original content item having a same genre, and that the voting cycle for many of content items may overlap. For example, there are may be hundreds of thousands of musical songs in a particular sub-genre that are being assessed in simultaneously occurring voting cycles performed in accordance with a HTAP.

Figure 5:
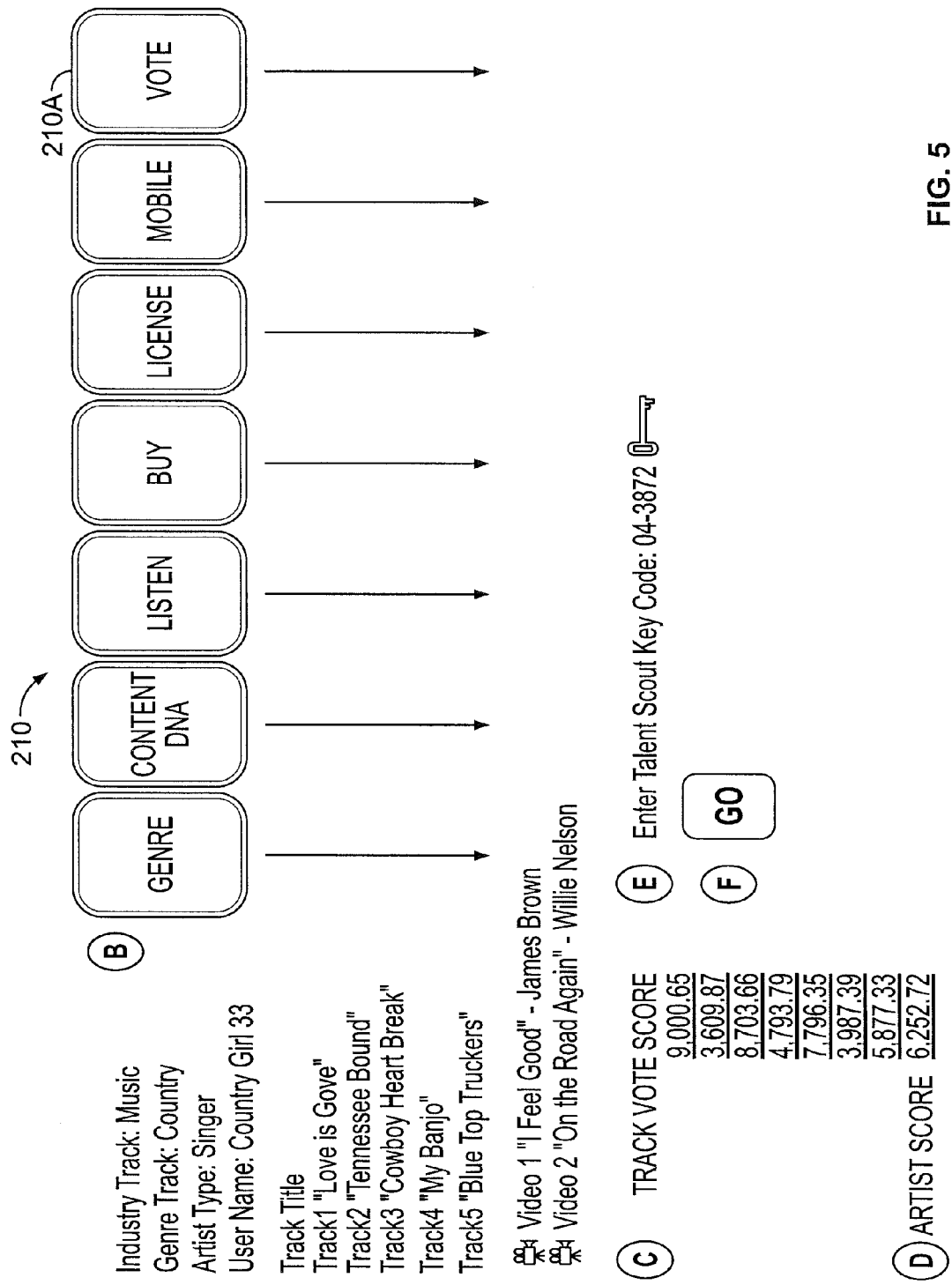
FIG. 5 is an exemplary screen display for an original content creator, in accordance with an aspect of the present invention.

In one embodiment of a voting cycle performed in accordance with a HTAP, the voter may access the talent website using the computer 14 and request a search to be performed for a particular musical artist of a particular genre, such as country music. Referring to FIG. 5, the website, in response to the request, may cause display of a screen display on the monitor of the computer 14 listing the songs submitted by the artist and the real time voting result status for the respective songs and the artist. Also, the screen display may include selectable icons 210 that permit the voter to listen, buy (download) or license a particular song of the artist.

In one embodiment, depending on the voting category designated for the voter by the server 50 and time remaining in a voting cycle for one or more content items of the creator, a selectable voting icon 210A may be displayed to allow the voter to vote for a content item, for example, a song of the artist. In order to vote, the voter is required to enter a password, such that any voting related actions may be tracked specifically to the voter.

Referring again to FIG. 4, the voting cycle may be divided into time periods (Intervals) that correspond to respective voting hierarchy categories (Categories). In an embodiment of HTAP, a voter in a particular voting category can vote only while a particular interval of the voting cycle is occurring. For example, referring to FIG. 4, the voting cycle may have the following Intervals: Interval 1—start to 30 days, Interval 2-31 to 60 days, Interval 3-61-90 days, Interval 4-91-120 days, Interval 5-121-150 days; and Interval 6-151-180 days. Voting may be performed during the Intervals 1-6 only by voters designated in Categories 1-6, respectively.

During each Interval of a voting cycle for a content item, the server 50 may continuously monitor voting status for the content item, and the associated creator, and make such voting result information available for access on a webpage of the talent website, and also use such voting result information in searching performed on the talent website.

In one embodiment, a voting cycle in accordance with HTAP may proceed as follows. At the end of each Interval, a selected number of content items having the highest voting scores among content items of a same genre of a same industry may be made available for voting during the next Interval. For example, after voting for rock songs by only Category 1 voters is concluded for Interval 1, then the 25,000 rock songs with the highest voting scores at the end of Interval 1 are made available for voting by Category 2 voters during Interval 2. The same type of hierarchical filtering of songs, using highest voting scores, occurs at the end of each subsequent interval, such that when voting occurs at Interval 6, a relatively small number of content items, such as the 100 rock songs having the highest voting scores at the end of voting of Interval 5, are eligible for voting by the Category 6 voters. The server 50 monitors and tracks voting by the voters throughout a voting cycle, such that voting related information is available in real time to voters and creators as voting progresses through the hierarchy of voting categories.

In one embodiment, a voter may vote for an original content item by using a mouse or cursor to click on an icon displayed on a screen display in association with a content item.

In an alternative embodiment, a range of scores for voting on a content item may be from 0 to 9105 or some other like value not divisible by 10 or ending in a decimal. The use of ranges of potential scores of such type may provide increased objectivity to voting results for indicating a talented creator, in that the voter may not subconsciously automatically default to a standard scale, such as 0-10, which may result in the voter submitting voting scores that do not accurately reflect the voter's evaluation of talent.

In another embodiment, the ranking of creators and/or content items based on voting score results may be subject to a predetermined number of votes being cast for a creator. For example, a creator who registered with the talent website only for a relatively short time and received 10 votes for a content item that generate a score of 5987 would not be ranked higher than a creator who has been on the website for a longer time period, has received a total of 10,000 votes and has an average voting score of 5,000.

The voting results displayed on a display screen of a webpage of the talent website may include voting scores for each content item of the creator, which are obtained by averaging all voting scores for the respective items, and also a voting score for the creator, which is equal to the sum of the average voting scores for the creator's content items divided by the number of content items of the creator on which voting is completed or ongoing.

In one embodiment, the server 50 may provide on a webpage of the talent website a detailed, real time history of voting result information for the creator and the content items of the creator. The voting result information, which is desirably obtained from voting in accordance with a HTAP, may include real time voting scores over predetermined time intervals and show changes in voting scores over defined time intervals. Referring to FIG. 6, the real time voting information may be displayed on a portion of a musician's home page of the talent website in the form of a dashboard, and include a detailed history of voting for the musician and the songs submitted, such as yearly, weekly and daily variances in voting scores and vote volumes over predetermined time intervals.

In a further embodiment, the real time voting information may be retrieved based on a search performed using the voting result information obtained from a HTAP and with search criteria including geographical location and language. In addition, the display of the real time voting information for a creator in an industry may be controlled, based on search criteria or user input entered following return of search of results, (i) to arrange the creators in a particular industry returned in the search results having highest voting scores, such as the top 100 creators, from highest to lowest voting score or vice versa; (ii) to arrange the content items of the top 100 creators from highest score to lowest score or vice versa; and (iii) to categorize the content items and creators by genre or sub-genre, or another distinguishing characteristic, such as musical instrument played.

In another embodiment, the server 50 may provide an automatic notification service to a voter or creator who registers for such service, or alternatively to an individual not registered with the server 50. The service may provide for automatically transmitting notifications by email to PDAs, smart phones, email accounts, etc., when a predetermined creator's voting score rises or decreases to a predetermined score.

In another embodiment, the server 50 may use artificial intelligence algorithms to determine whether voting results for a particular artist can be generalized. For example, if the voting results indicate that 3000 black females of a certain age and a certain geographic area voted for a particular male R&B singer who has the highest voting score among other R&B singers currently having content items being assessed in a voting cycle, or who previously had content items assessed in a voting cycle, conducted according to a HTAP, the server 50 may generate a voting result indicating that the particular singer may have the same ranking for a particular state or across the entire country with a defined margin of error.

Referring again to FIG. 3, in block 208 a creator or voter may request a search be conducted on the talent website, using voting result information obtained in accordance with a HTAP, to retrieve a search result of an original content creator for a particular industry, or genre or subgenre of the industry, deemed to have talent, based on talent assessment information, such as voting result information. For example, original content items, such as country music songs, having the 5 highest voting scores, based on voting during voting cycles for such songs, may be identified based on a search request for talented country music songs. The songs, along with the identity of the creators of the songs and descriptive information of the creator and information concerning voting for the songs, may be returned as search results in response to the search request. The search conditions that may be submitted for performing a search for original content items or original content creators may include, for example, a characteristic of an original content item and/or original content item creator, such as the geographical location, genre, relevant industry and genre; a category of a voter that voted for the content item or creator; and the current or past voting result status of the content item or creator, such as voting results by a particular category of voters. For example, a search may be requested for the highest or a highly rated country song based on voting by particular voters, for example fans or Category 1 voters, from Virginia, all genders of voters and only voters in the age group of 18-23.

In one embodiment, an individual who is not registered with the talent website may perform searching, as described above for block 208. The website may limit the information returned in the search results to such person, and provide that further information, such as additional descriptive information concerning the creator or voting resulting information, may be obtained for a fee.

In another embodiment, the talent website may charge a fee to a voter in accordance with a number of industries to which the voter desires to have access and for which the voter desires retrieve information related thereto from a search performed on the talent website.

In block 210, the server 50 may return search results responsive to the search request, and provide for display of the search results on a screen display on the computer 16. The search results may include, for each original content item or original content creator included in the search results, real time talent assessment information, such as voting scores, from a talent assessment performed according to a HTAP and characteristics of the returned search result content item or creator.

Referring to FIG. 5, the server 50 may provide opportunities for playback and purchase of the content items, such as songs, of the creators retrieved from a search on the website, and generate and store information indicating the identity of the purchaser and the purchasing activities of the purchaser. The purchaser may be another registered creator, a registered voter or an individual not registered with the talent website.

In one embodiment, the server 50 may provide access to talent assessment information, such as voting score results, or selected other information to individuals who are not registered with the talent website. The access may include a right to purchase or playback an original content item.

In one aspect of the invention, the server 50 may incentivize increased quantity and accuracy of voting, to increase the level of objectivity of a talent determination determined from the results of voting during voting cycles in according with a HTAP, by monitoring voting by each of the voters and determining an award for the voters based on the voting by the voters. In one embodiment, the server 50 may monitor the quantity of votes cast by each voter, the rankings of the content items for which the voters voted and the rankings of the creators who submitted the content items for which the voters voted. As a voter is aware that both the quantity and accuracy of the votes are tracked by the server, it is believed that the voter is likely to vote with greater diligence while also voting as frequently as possible. In one embodiment, a voter may be required by the talent website to vote a predetermined number of times during a predetermined period to remain eligible to vote on content items of creators. Consequently, a larger number of votes may be obtained, with an expected high level of accuracy in terms of an objective assessment of talent of the creators, such that the voting results used to return search results of content creators having the highest voting scores can be relied upon to indicate the talent of such creators with a relatively high level of objectivity. In other words, based on the expected large number of voters who will vote for content items on the talent website, and also the diligence with which the voters will cast votes, it is believed that the search results returned for a search for creators with talent will identify creators, within a particular industry, or genre or sub-genre of an industry, of interest to the searcher, who have a particular talent, aptitude, skill or physical attribute (collectively "talent"), with a relatively high level of objectivity. The identification of a creator having talent, in turn, should correlate to a high likelihood that there will be a high level of commercial demand for the creator in the particular industry.

Thus, for example, a search may be performed on the talent website by an industry expert, such as music producer, for a talented musician in the rock genre, who can sing and play the guitar and saxophone and who is scheduled to perform in a particular geographic area. The search results may identify a rock singer who plays guitar and saxophone, has been deemed talented based on having a voting score in the top for his genre, and is scheduled to perform in the geographic area identified in the search results. This search result allows the expert to easily personally assess the rock singers who have been identified, with a high level of objectivity, to have talent by the talent website. In another embodiment, the server 50 may, responsive to a search request for a talented creator in a particular industry and genre of the industry, generate a screen display indicating geographic location of scheduled performances of creators having a highest voting score based on voting in accordance with HTAP.

In addition, based on a search on the talent website, individuals believed to have a high level of expertise of assessing talent in an industry, such as those designated as Category 6 voters by the server 50, may be able to obtain, as a search result, those voters in other categories who consistently vote for creators which have the highest voting rankings in a particular genre. Such so-called best voter information may provide an additional resource of talent information, and the Category 6 voters, for example, may use the talent website to track the voting preferences of the best voters.

In one embodiment, the server 50 may provide for display on a screen display, such as shown in FIG. 7A, of voting score results for a voter which show an average score for a content item of a creator in relation to the score given by the voter, and a variance between the score of the voter and the mean score for a particular content item or content item creator. Referring to FIGS. 7B and 7C, the display may show voting results for a voter on multiple content items of the same genre in an industry, with the voting score of the voter shown as a variance from the mean score for the particular content item. The display may also highlight, such as using color, shading or like indicia, different variance ranges in relation to the mean, to allow for ease of recognition of accuracy of the voting by the voters.

In one embodiment, the server 50 may provide that each registered voter has a home page on the talent website on which they can vote and track the quantity and accuracy of their voting.

In one embodiment, the server 50 may use the voting results of a voter to determine an award based on a combination of the quantity, accuracy and consistency of voting by the voter during a predetermined time period, such as one month. For example, Category 1 voters may become eligible to receive an award if, within a fixed time period, they vote for a predetermined number of content items or creators. Assuming the above criteria is satisfied, the Category 1 voters who vote, with greatest accuracy, for example, for a creator or content intent item having a highest voting score in a genre or subgenre, may be awarded with a percentage of advertising revenue generated by the website, or other awards, such as tickets to a concert of their favorite band.

In another embodiment, the voting results may be used by the server 50 to determine compensation for MLMs. The compensation may be determined for a certain time period, such as a month, and be based on (i) quantity of votes cast by the MLM; (ii) quantity of votes cast by voters associated with the MLM; (iii) accuracy of voting by the MLM; and (iv) accuracy of the voting by the voters associated with the MLM, who typically are in a lower category in the hierarchy than the MLM.

In a further embodiment, the server 50 may determine an award for a MLM, based on a number of purchases or licenses from the website of content items of a creator represented by the MLM, by a voter associated with the MLM, or alternatively by anybody. In one embodiment, a MLM may receive a percentage of each transaction an associated voter completes using the website. Thus, the MLM may be encouraged to increase the number of voters associated with the MLM, which in turn may increase the total of number of voters that assess the talent of creators, which as a consequence may further increase the level of objectivity of an indication of talent of a content creator who may be included in a search result returned responsive to a search for talented content creators performed using the talent website.

In an addition, the server 50 may determine a compensation award for a creator based on a total number of purchases or licenses of the content items of the creators from the talent website.

In one embodiment, a voter designated in a particular category, such as Category 1, may be required to purchase a predetermined number of content items, such as songs, during a predetermined period. It is believed that the voter, by being eligible to receive an award based on quantity and accuracy of voting, which desirably is near to or and exceeds the cost of the purchases required for the period, would continue to vote often and with diligence. The increased voting with diligence, in turn, may increase the likelihood that the voting results used by the talent website, in response to a search request for talented creators in a particular industry or genre of an industry, result in return of a search result including creators that objectively have talent in the indicated industry and genre.

In another embodiment, the MLMs may have a separate link on the home page of the talent website.

In another embodiment, creators, and optionally individuals not registered with the talent website, for a limited time or for a fee, may conduct a search on the talent website for MLMs according industry, genre, quantity of votes, accuracy of votes, position, geography, etc.

In a further aspect, the server 50 may provide that creators, for a fee, may have their original content items submitted to select individuals registered with the talent website to assess talent, which may include selected voters, who assess the original content items and/or original content creator and provide assessment feedback using voting preference submissions. Such select talent assessors desirably may include those individuals considered to be very experienced and influential in identifying talent in a particular industry. The select talent assessors desirably may enter into a revenue sharing agreement with the talent website to provide the voting preference submissions. For example, in the music industry, the select talent assessors may be Category 6 voters, such as celebrities, music producers and music industry executives who are perceived to have an aptitude, skill, expertise or attribute deemed to be valuable to the music industry. Such individuals are believed to be able to identify a talented musician for which there will likely be high commercial consumer demand, and thus can influence the commercial development and publicizing of the musician, such as by their own action or by introductions to other influential individuals in the music industry. The select talent assessors may provide talent assessments in the form of voting preference submissions that indicate a level of approval or perceived potential for success of the original content creator and/or their content items. The voting preference submissions may include feedback and comments from the select talent assessor. The voting preference submissions, including the associated feedback and comments, may be available, in substantially real time, for retrieval in a search conducted on the talent website by voters or creators, or for use in notifying others, such as voters or creators or other selected talent assessors, about the voting preference submissions and the characteristics of the selected talent assessor who provided the submissions with the associated feedback.

In one embodiment of a voting preference submission, the select talent assessor may submit that: 1) he strongly likes the creator, and considers the creator to have talent above the norm for other creators in the same industry and genre/sub-genre; 2) he likes the creator but not as much as creators indicated as strongly liked; 3) he believes that the creator has strong potential for commercial success; or 4) he believes the creator has some potential for commercial success but not as much potential as the creators indicated as having strong potential. The server 50 may display on a selected webpage of the website, or in response to a search request, substantially real time information representative of the voting preference submissions in the form of a grid display having multiple quadrants corresponding to the indicated levels of approval or success potential. In one embodiment, referring to FIG. 8, the grid display may have four quadrants including Quadrant I (Strong Like), Quadrant II (Like), Quadrant III (Much Potential) and Quadrant IV (Potential). Within each of the quadrants, a selectable icon or other indicia, such as a colored circle, representative of a creator in an industry which received a voting preference submission for the quadrant, may be displayed. The creators for whom voting preference submissions are submitted may include, for example, models, producers, artists, musicians, fashion designers, songwriters, dancers and athletes. When the icon on the grid display is selected or scrolled over, such as by a cursor controlled by a mouse, another screen display, such as shown in FIG. 9, may be displayed, alone or with the four-quadrant screen display, and include the selected icon, descriptive information of the selected talent assessor who provided the submission, and feedback and comments provided by the selected talent assessor. In another embodiment, selection of the icon may cause display of a screen display including descriptive information of the corresponding creator, such as shown in FIG. 5.

In one embodiment, the revenue sharing agreement between the talent website and the select talent assessor may provide compensation to the select talent assessor based on the commercial success of the creator identified in a predetermined category of voting preference submissions. For example, where a musician is identified as having a high potential for commercial success by the select talent assessor and a song of the musician has been downloaded in excess of a predetermined number of times from the talent website, the select talent assessor may receive a percentage of the fee collected for each download.

Figure 8:
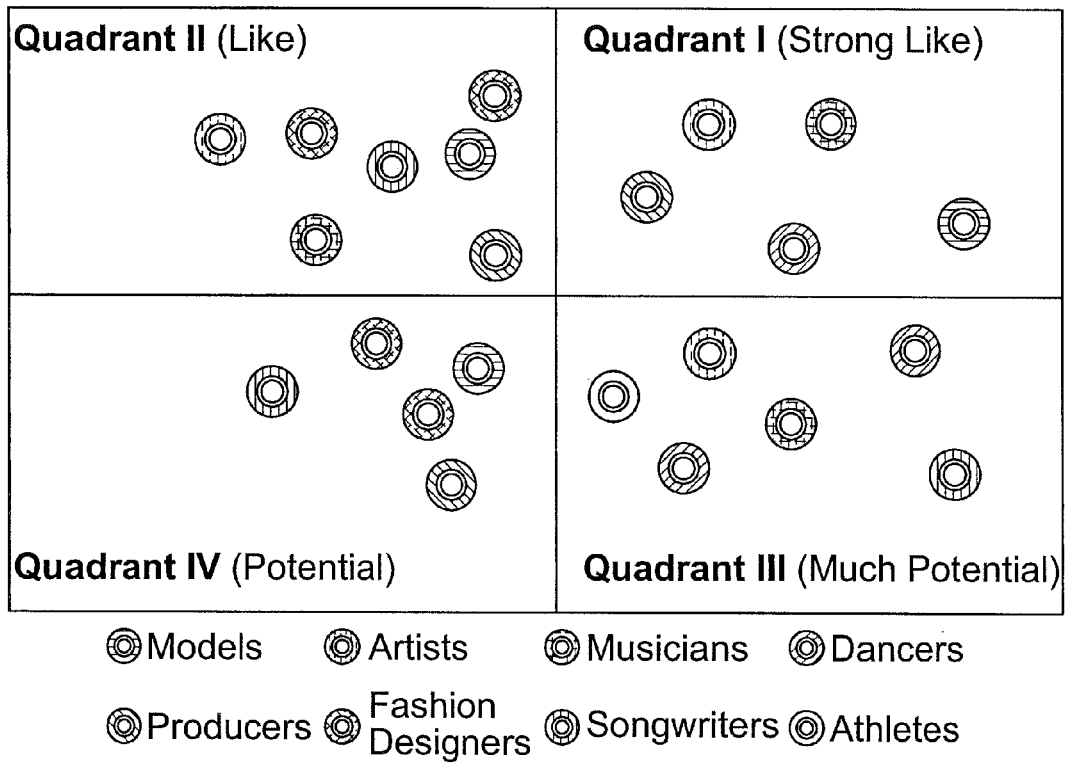
FIG. 8 is an exemplary screen display of talent assessment results arranged in a grid, in accordance with an aspect of the present invention.
Figure 9:
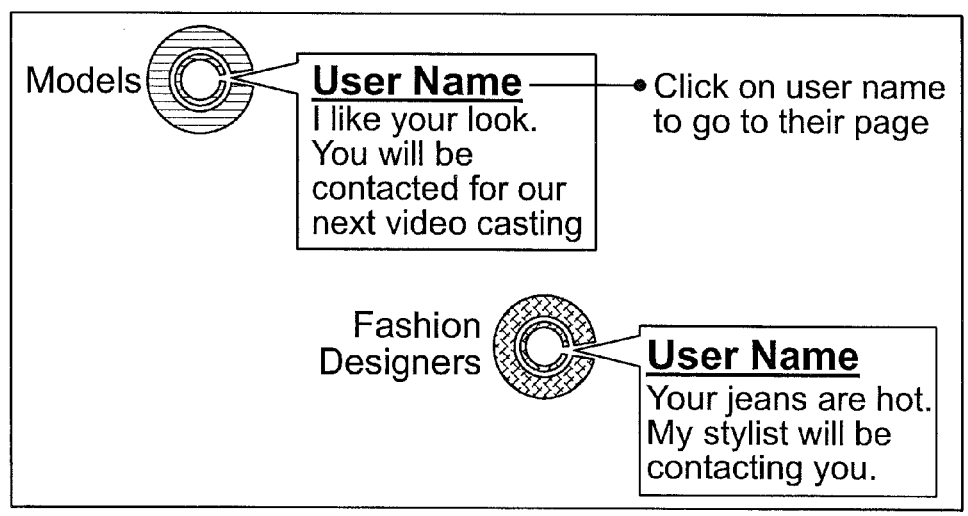
FIG. 9 is an exemplary screen display of comments provided as part of a talent assessment, in accordance with an aspect of the present invention.

In one embodiment, the server 50 may provide that a link to obtain screen displays of the form and including information displayed as exemplified in FIGS. 8 and 9 is included on a home page of a creator, or only a home page of a selected talent assessor or voter.

In another embodiment, the server 50 may provide that individuals not registered with the talent website may obtain the voting preference submission information by performing a search for creators in a particular industry, genre and/or subgenre.

In another embodiment, the server 50 may provide a notification, such as via email, to a selected voter, such as voter having a highest category designation for a particular industry, a selected talent assessor or the creator for which a voting preference submission was submitted, that the voting preference submission for the creator is available for review, such as in the form of the grid display described above.

In a further aspect of the invention, the server 50 may facilitate performance of a hierarchical talent evaluation and feedback information distribution method in which original content items may be assessed in accordance with a HTAP, by predetermined evaluators selected by the server. The server 50 may provide that results of assessments by the evaluators, including textual feedback of the evaluators, are distributed to and accessed by individuals of a particular industry selected by the server based on their having a high likelihood of recognizing talented creators and commercializing creators in the particular industry ("influential assessors").

In one embodiment of the hierarchical evaluation and distribution method, the original content creators may include any person or entity that creates written artistic content, such as freelance writers to media outlets, songwriters, composers, authors for books and poetry, screenwriters, theatrical playwrights, writers for television and cable media companies, writers for comedians and comedic TV networks and the like. The written original content items may include editorials for newspapers and magazines, song lyrics, musical compositions, manuscripts for books, poems, film scripts and/or screenplays, television pilots, scripts for theatrical plays and the like.

The evaluators may include individuals determined by the server 50, based on descriptive information submitted to the server 50, to have credible practical working experience and/or education in the evaluation of written artistic content in terms of having an expert opinion on whether written artistic content items is likely to be commercially successful, or the creators of such items have the attributes to create written artistic content likely to be commercially viable on a regular basis to a particular industry, such as the arts and entertainment industries of music, musicianship, general media including magazines and newspapers, publishing, theatrical productions, film and movies, comedy, television and all of their corresponding genres and/or subgenres. The evaluators may be selected by the server 50, for example, based on whether the descriptive information indicates the individual is a graduate student having superior academic performance in the pursuit of undergraduate and graduate degrees, a college and university professor having years of experience in evaluating written artistic content, and/or a professional having demonstrated working experience in the relevant particular industries.

The influential assessors may be selected talent assessors, determined as set forth above. Alternatively, individuals may be determined by the server 50 as influential assessors based on their descriptive information indicating that they are or have been under contract with industry entities, such as described below, to produce and create original content; have significant awareness and/or recognition from the general public or niche groups in certain artistic industries affiliated therewith; are perceived to have an aptitude, skill, or physical attributes considered to be above the norm when compared to the rest of the population; and are able to evaluate written artistic content and writers with an expert opinion with respect to the particular industry in the arts and entertainment industry that the individual has gained the status of a celebrity; and are perceived to have some influence or power to be able to recruit writers to use towards the creation of their own artistic content and/or to introduce writers to the industry entities and industry executives with which they are affiliated. The industry entities may be business entities that employ individuals (industry executives) having job responsibilities associated with locating and developing writers, and creating written content with the intent on incorporating the written content toward the producing of content defined as songs for CDs and digital MP3s, movies, TV shows, books, theatrical plays, musical productions for orchestras and symphonies, editorials for newspapers and magazines, jokes for comedians and comedic networks all for the intent and purpose to create and distribute such artistic content for commercial intent. The industry entities and industry executives have the business relationships, expertise, financial resources, and on-going artistic content production of projects and access to celebrities where written artistic content is needed on an on-going basis.

In one embodiment, the server 50 may determine an individual to be an influential assessor, based on the descriptive information indicating that such individual has some power and/or influence to further commercialize the writers or their content, such as by purchase or license of existing written artistic content, such that the writers may be motivated to participate in a HTAP of the talent website to obtain the opportunity to solicit and/or communicate directly with those having such power and obtain some feedback regarding the quality of their written artistic content for purposes of consummating some type of contract in which their written artist content is exchanged for monetary gain and/or access to those of influence in the relevant industry.

Referring to FIG. 3, the writers may register as a creator and submit content item and descriptive information, similarly as described above in block 202, and the evaluators may register with the talent website and provide descriptive information, similarly as described in block 204 above for voters. The server 50 may determine, and assign to the evaluators, category designations according to a hierarchy for assessment of written talent, similar to the categories designated as described above. After the submission of written content items, the writer may submit a request for assessment of the content item(s), according to the hierarchical evaluation and feedback information distribution method, by payment of a fee. The written content items may then be made available for evaluation by evaluators in the particular industry and genre/subgenre indicated for the content item. The evaluators may evaluate the written content items according to a HTAP having several categories and where content items are successively evaluated in categories in the hierarchy, similarly as described above. In one embodiment, the evaluators may only assess talent of the writers with respect to a particular industry of expertise and may have access limited to written content items only within their designated category in the hierarchy. Similarly as discussed above for the voters, the assessments and feedback provided by, and information relating to, the evaluators may be monitored by the server 50.

In one embodiment, the evaluators may score the content items in a range from 0 to 1,000 according to rating criteria topics set by the server 50, where each criteria has a different weighted score percentage. The product of the evaluator's score and the weighting percentage produces a weighted score for a rating criteria, and the final scores for the respective criteria are summed to obtain a final weighted score. Based on the final weighted score, the server 50 may determine whether the content item is assessed at the next higher category in the hierarchy. In a desired embodiment, the rating criteria topics and weighted score percentages may be adapted to control the quantity of content items that are assessed in a higher category in a hierarchy.

Figure 10:
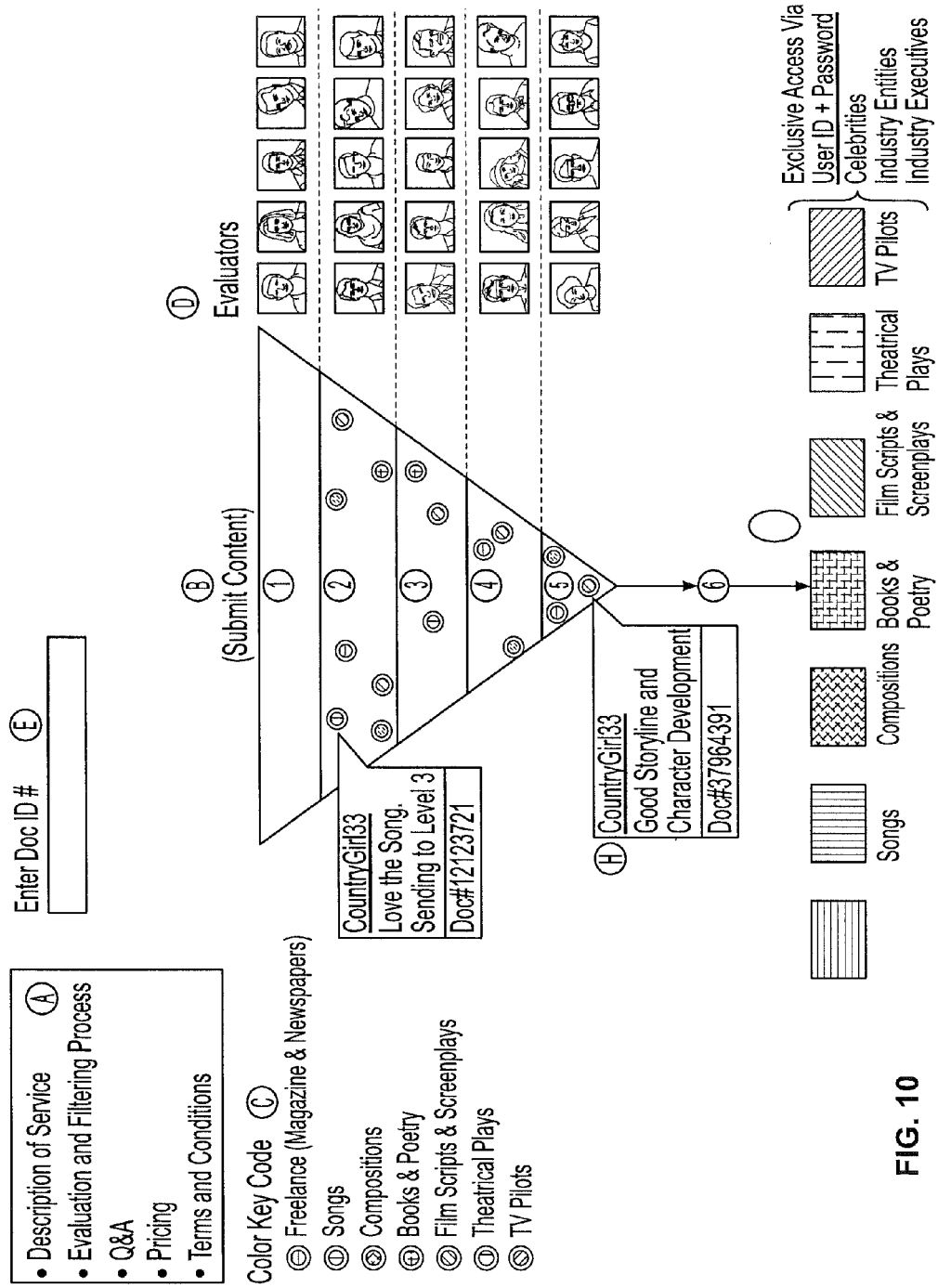
FIG. 10 is an exemplary screen display of talent assessment results relating to written original content, in accordance with an aspect of the present invention.

After assessment of the written content item is completed by the evaluators in a particular category, the server 50 in substantially real time may transmit email notification on assessment status, such as voting score results, and related information of the assessments of the category. In one embodiment, the server 50 may provide for display of a screen display, as shown in FIG. 10, to permit the writer to determine the status of assessments, and obtain feedback information on each written content item submitted. The written content items may be displayed as colored dots on the display and positioned to identify the current stage (category) of assessment in a HTAP. In addition, by selecting or moving a mouse cursor across the dot, a display portion including textual feedback from an evaluator, and descriptive information of the evaluator, may be displayed. In one embodiment, in the event a writer or his content item is assessed in a highest category of the hierarchy, the server may generate and transmit to the writer an email requesting further information, providing additional feedback regarding the writer and his written artistic content, and providing information regarding beginning commercialization of the content on the behalf of the writer with, for example, the selected talent assessors in the relevant industry.

In one embodiment, the influential assessors of the relevant industry, for each of the written content items passed to the highest category in the hierarchy, may access and review all feedback on the written content and the corresponding writer from the evaluators at all hierarchy categories.

In one embodiment, individuals not registered with the talent website may access evaluator assessments, such as on a display shown in FIG. 10, from which they may determine the extent of assessment of a particular written content, such as the number of categories in the hierarchy at which the written content item has been evaluated by evaluators. The written content items passed to the higher hierarchy categories may be considered to have more quality in terms of having the characteristics of being more commercially viable.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of monitoring assessment information comprising:
   registering, with a server, (i) a plurality of assessable elements to be eligible for voting thereon by a plurality of assessors and (ii) the plurality of the assessors to be eligible to vote on the assessable elements, wherein registering of the assessable elements includes a subscription fee payment and registering of the assessors includes a minimum requirement for purchasing from the server over a predetermined period so as to be eligible to receive an award;
   monitoring, in substantially real time, assessment by the assessors for the assessable elements based on assessment information received over a communication network, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor; and
   generating, in substantially real time, display data to control display on a screen display of voting score results of the first assessor relative to at least one other of the assessors that voted on a same assessable element for which the first assessor voted.

2. The method of claim 1 further comprising:
   determining an award for the first assessor, using the assessment information, based on a number of votes cast for the assessable elements by the first assessor and voting score results for the first assessable element relative to the voting score results for at least one assessable element having a same characteristic as the first assessable element.

3. The method of claim 1 further comprising:
   awarding an award to the first assessor based on a sum of purchases from the server by a second assessor in a lower category than, and associated with, the first assessor.

4. The method of claim 1, wherein the display data is to control the display on the screen display to show the voting results indicating number of votes cast and a voting accuracy score for the first assessor over the predetermined interval.

5. The method of claim 1, wherein the assessable element is at least one of an original content item and an original content creator.

6. A system for monitoring assessment information comprising:
   a controller including a processor and a memory, wherein the processor is operable to:
   register with the system (i) a plurality of assessable elements to be eligible for voting thereon by a plurality of assessors and (ii) the plurality of the assessors to be eligible to vote on the assessable elements, wherein registering of the assessable elements includes a subscription fee payment and registering of the assessors includes a minimum requirement for purchasing from the server over a predetermined period so as to be eligible to receive an award;
   monitor, in substantially real time, assessment by the assessors for the assessable elements based on assessment information received over a communication network, wherein the assessment information indicates a voting score among a plurality of voting scores, wherein a first assessable element is available to be voted on with a voting score by a first assessor based on a category of the first assessor among a plurality of categories in a hierarchy and an average voting score attained for the first assessable element among a plurality of the assessable elements over a predetermined time interval for voting by assessors having a lower category in the hierarchy than the first assessor; and
   generate, in substantially real time, display data to control display on a screen display of voting score results of the first assessor relative to at least one other of the assessors that voted on a same assessable element for which the first assessor voted.

7. The system of claim 6, wherein the assessable element is at least one of an original content item and an original content creator.

* * * * *